United States Patent [19]

Robinson et al.

[11] 4,341,873
[45] Jul. 27, 1982

[54] FLUOROZIRCONATE, GLASS AND THE PROCESS FOR MAKING THE SAME

[75] Inventors: Morton Robinson, Agoura; Ricardo C. Pastor, Manhattan Beach; Morris Braunstein, Marina del Rey, all of Calif.

[73] Assignee: Hughes Aircraft Company, Culver City, Calif.

[21] Appl. No.: 296,098

[22] Filed: Aug. 26, 1981

Related U.S. Application Data

[63] Continuation-in-part of Ser. No. 131,605, Mar. 19, 1980, abandoned.

[51] Int. Cl.³ .................. C03C 3/12; C03C 13/00
[52] U.S. Cl. .................. 501/40; 65/30.1; 350/96.34; 501/37; 501/904
[58] Field of Search .............. 65/32, 30.1; 501/40, 501/37, 904; 350/96.34

[56] References Cited

U.S. PATENT DOCUMENTS

| | | | |
|---|---|---|---|
| 2,466,507 | 4/1949 | Sun | 501/40 |
| 2,946,668 | 7/1960 | Richelsen | 423/491 X |
| 3,816,600 | 6/1974 | Huizing et al. | 423/464 X |
| 4,141,741 | 2/1979 | Lucas et al. | 501/40 |
| 4,189,208 | 2/1980 | Grodkiewicz et al. | 350/96.34 |
| 4,308,066 | 12/1981 | Mitachi et al. | 501/40 X |

FOREIGN PATENT DOCUMENTS

| | | | |
|---|---|---|---|
| 552959 | 2/1958 | Canada | 106/47 Q |
| 2396981 | 3/1979 | France | 350/96.34 |

OTHER PUBLICATIONS

Poulain, M. et al., "Nouveaux Verres Fluores" Mat. Res. Bull. 12 (2), Feb. 1977, pp. 151-156.

*Primary Examiner*—Helen M. McCarthy
*Attorney, Agent, or Firm*—B. T. Hogan, Jr.; W. J. Bethurum; W. H. MacAllister

[57] ABSTRACT

Improved multicomponent fluorozirconate glasses, doped with chlorine, and a process for making them are disclosed that are continuously transmissive in the infrared spectrum.

9 Claims, 3 Drawing Figures

FLUOROZIRCONATE, GLASS AND THE PROCESS FOR MAKING THE SAME

This application is a Continuation-In-Part of U.S. Application Ser. No. 131,605 filed Mar. 19, 1980, now abandoned.

TECHNICAL FIELD

This invention relates generally to the preparation of fluorozirconate glass and more particularly to the preparation of $ZrF_4$-$ThF_4$-$BaF_2$ glasses.

BACKGROUND OF THE INVENTION

1. Field of the Invention

This invention provides a new and improved process for making fluorozirconate glasses intended for use in numerous applications requiring excellent optical transparency from the ultraviolet to the infrared portion of the electromagnetic wavelength spectrum. This invention describes an optimum process for preparing fluoride glasses which eliminates most, if not all, of the disadvantages of prior art fluoride glasses.

2. Description of the Prior Art

Multi-component fluorozirconate glasses, a relatively new class of materials, were reported first by N. M. Chanthanasinh in his doctoral thesis for the University of Rennes (France) in July of 1976 and later by Poulain et al in the Material Research Bulletin 12, 151 (1977). Both authors were concerned with the zirconium tetrafluoride-thorium tetrafluoride-barium fluoride ($ZrF_4$-$ThF_4$-$BaF_2$) system.

The preparation technique typically used by these earlier workers consisted of reacting highly purified components at 800° to 900° C. in an argon atmosphere. The starting materials used in the above system were contained in a hermetically-sealed nickel crucible and the glass produced by the system was formed by pouring the fully reacted melt into a mold residing in a nitrogen-filled glove box.

The vitreous domain for $ZrF_4$-$ThF_4$-$BaF_2$ was described as an area of a triangle on the ternary diagram bounded by the following maxima: 63 mole percent $ZrF_4$; 15 mole percent $ThF_4$; and 38 mole percent $BaF_2$. Fluoride glasses prepared in accordance with these teachings are unacceptable for our intended uses, because of their absorption and physical strength characteristics.

Applicants know of no other prior art that is as relevant as that identified and described above.

SUMMARY OF THE INVENTION

The general objective of this invention is to provide an improved fluorozirconate glass that is continuously transparent from the ultraviolet to the infrared region of the electromagnetic wavelength spectrum.

In accomplishing this objective while avoiding most, if not all, of the disadvantages of the prior art and at the same time, retaining the advantages of said art, we have invented a new and improved chloride doped fluorozirconate glass that is comprised of zirconium tetrafluoride, thorium tetrafluoride, and barium fluoride that has essentially no hydroxyl ($OH^-$) or oxide ($O^=$) ions.

These glasses are prepared by a process which begins with the preconditioning of the reactant materials in a reactive atmosphere (RA) and ends with the casting of the vitreous material under a reactive atmosphere. Specifically, zirconium tetrafluoride, thorium tetrafluoride and barium fluoride are each treated in the reactive atmosphere HF to remove any oxide and/or hydroxyl contaminants therefrom prior to their use to form a reactant mixture in the desired molar proportions.

The precondition starting materials are then mixed thoroughly to form a powder mixture, having a composition which falls within the vitreous domain for the system undertaken.

The temperature of the mixture is raised, in the presence of a reactive atmosphere, to a temperature sufficient to cause the mixture to become molten. The resulting melt is allowed to stand in the presence of a reactive atmospheric purge from 2 to 6 hours. It is then cast in situ, or poured into a mold, annealed and allowed to cool rapidly to a vitreous glass.

It is therefore an objective of this invention to provide a new and improved process for preparing fluorozirconate glasses that yield products which are highly transparent in the infrared portion of the electromagnetic wavelength spectrum.

A further objective of this invention is to provide a fluorozirconate glass that is suitable for use as laser windows and fiber optic elements.

And, a still further objective of this invention is to provide a fluorozirconate glass that: exhibits exceedingly strong structural characteristics; is exceptionally hard; is insoluble in water; and to provide a glass that will exhibit a high rupture strength, a high yield strength, and good erosion resistance.

That we have accomplished these objectives and others will become apparent upon reference to the following brief descriptions of the drawings and detailed description of the invention.

DETAILED DESCRIPTION OF THE INVENTION

We have discovered that the optical transmission, mechanical strength, density, hardness and overall utility of fluoride glasses comprised of complex mixtures of $ZrF_4$, $ThF_4$ and $BaF_2$ can be significantly enhanced by removing hydroxyl ($OH^-$) and oxide ($O^=$) ions inherently constituted in the compositions of these glasses. The removal of all $OH^-$ and $O^=$ ions from the composition of these glasses by our process leaves a glass containing $ZrF_4$-$ThF_4$-$BaF_2$ for which a small amount of the fluoride is substituted by chloride arising from the reactive atmosphere of $CCl_4$. This new glass exhibits physical, mechanical and optical characteristics quite unlike any complex fluorozirconate glasses known in the art.

The unique glasses of our invention are formed from reactants that are preconditioned to increase their purities prior to their use to form reactant mixtures.

Figure 1:
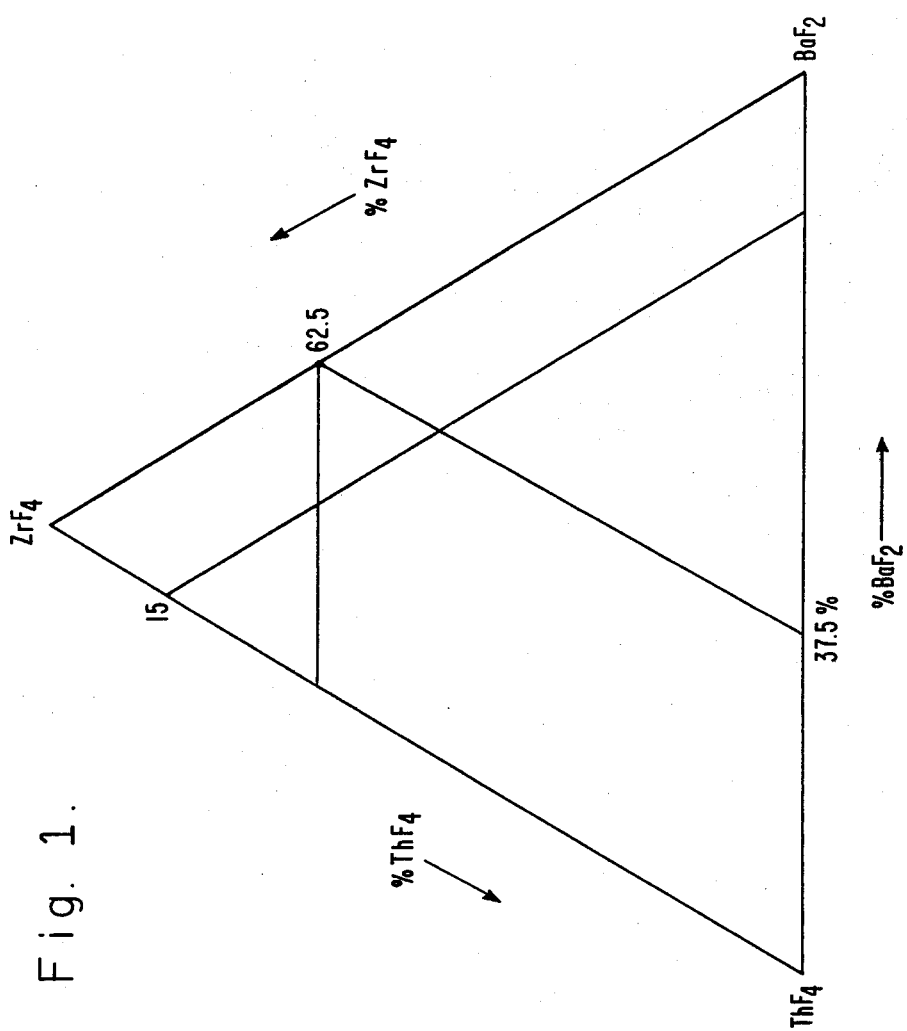
FIG. 1 shows a ternary diagram for a zirconium tetrafluoride, thorium tetrafluoride and barium fluoride system.

After preconditioning, as described below, the reactants are mixed in preselected molar proportions to form powder compositions or reactant mixtures which fall within the vitreous domain for ZrF$_4$-ThF$_4$-BaF$_2$. This domain can be described as an area of a triangle on the ternary diagram bounded by the following maxima: 63 mole percent ZrF$_4$, 15 mole percent ThF$_4$, and 38 mole percent BaF$_2$ as shown in FIG. 1.

The reactant mixtures are then placed in vitreous carbon or platinum crucibles and vacuum pumped to 300° C., in a graphite resistance furnace, at which temperature a reactive atmosphere (RA) comprised of helium (He) and a halogen source species is introduced. We have utilized carbon tetrachloride (CCL$_4$) as a nascent halogen source species and we have used HF as a halogen source species.

The temperature of the powder reactant mixture is further increased to a level of about 900° C. in the presence of the RA, which causes a melt to be produced, and held at that level to facilitate a scrubbing of the melt to remove OH$^-$ and O$^=$ ions. For a 0.58:0.33:0.09 molar ratio mixture of ZrF$_4$:BaF$_2$:ThF$_4$, a low viscosity melt will be obtained at from 800° to 900° C. However, higher temperatures may be utilized to ensure a more efficient reaction of the undesirable contaminants with the reactive species of the gaseous mixture.

After soaking the melt in a dynamic CCl$_4$/He atmosphere for from 2 to 6 hours at a constant melt temperature, an essentially perfect glassy specimen can be produced upon rapid cooling in the presence of the RA.

However, if hydrogen fluoride (HF) and He is used as an RA, this specimen will consist of two phases; a primary transparent colorless phase and a relatively small quantity of an opaque-black phase. While the mechanism of this phenomena is not clearly understood, we attribute it to a fluorine deficiency; apparently occasioned by the dissociation of ZrF$_4$. This condition is corrected or rectified by subsequently replacing the HF/He atmosphere with a gaseous mixture of He and CCl$_4$. The gaseous mixture of CCl$_4$ and He is, in this instance, referred to as a rectification mixture, because it rectifies the color center formation (of the ZrF$_4$ component) which occurs during an HF/He treatment phase and apparently produces the opaque black phase discussed above. The fluorine deficiency is eliminated by the introduction of a compensating amount of chlorine into the melt.

We prefer to utilize a CCl$_4$/He mixture as the nascent chlorine source species from the beginning of the process because it does not produce a fluorine deficient phase in the resultant glass. However, other chlorine compounds may be employed and are not excluded. It has been shown that CCl$_4$ pyrolizes at temperatures above 400° C. to form nascent Cl which tends to serve as a substitute for any F that may be displaced from the ZrF$_4$ component in deference to the stability of ZrO$_2$.

An He/CCl$_4$ gas flow rate, into the reaction chamber above the hot glass melt, of from 0.4 to 0.8 cm$^3$/sec provided sufficient quantities of Cl° to accomplish our purposes. However, depending upon the size of the reaction chamber utilized and the nature of the halogen source species, it may be necessary to alter the halogen source species flow rate to provide sufficient level time to allow the halogen source compound to pyrolize.

Carbon tetrachloride is an excellent RA source because of the following reaction paths:

$$2CCl_{4(g)} \rightarrow C_2Cl_{6(s)} + 2Cl°_{(g)} \qquad \text{I}$$

$$CCl_{4(g)} + 2OH^-_{(m)} \rightarrow 2Cl^-_{(m)} + 2HCl_{(g)} + CO_{2(g)} \qquad \text{II}$$

$$CCl_{4(g)} + 2H_2O_{(g)} \rightarrow CO_{2(g)} + 4HCl_{(g)} \qquad \text{III}$$

where: m=melt; s=solid; and g=gas.

The path described by Equation I leads to the formation of nascent chlorine which acts as a fluorine substitute to avoid fluorine deficiencies as discussed above; in Equation II, oxygen containing ions in the melt are removed; and in Equation III, moisture in the reaction environment is removed.

The process is concluded by casting the melt, annealing and cooling the cast material in the presence of the rectification mixture. We have utilized the crucible which contains the melt as the casting vessel in our experiments. However, casting may be accomplished by pouring the melt from the crucible into a mold in the presence of the reactive atmosphere by remote manipulation of the vessels in a reaction chamber isolated from the ambient atmosphere.

Fluoride glasses produced by the process described above are continuously transmissive from 0.2 micrometers ($\mu$m); commonly referred to as near-ultraviolet (UV), to 8.0 $\mu$m; commonly referred to as near-infrared (IR). Unlike the best prior art fluoride glasses, there are no light absorption bands centered at 2.9 $\mu$m in our glasses (see FIG. 2).

Figure 3:
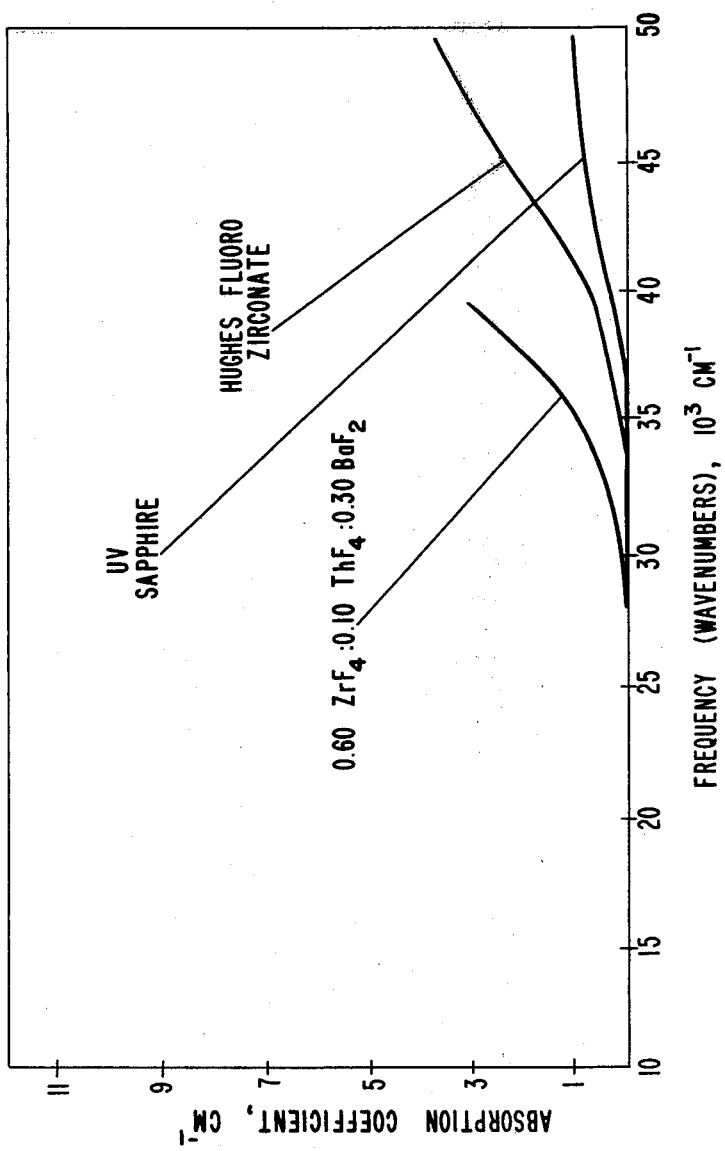
FIG. 3 compares the absorption coefficients of prior art glasses with that of the invention and with commercially ultraviolet grade sapphire.

The absorption coefficients of glasses prepared in accordance with the process described above may be compared with that exhibited by the best known Le Verre Fluore glass and a sapphire in FIG. 3. As shown in FIG. 3, the Hughes fluorozirconate glass exhibits substantially lower absorption coefficients than that exhibited by prior art fluorozirconate glasses, but not nearly as low as sapphire. The measurements, used to derive the curves in FIG. 3, were made with a Cary Model 14R spectrophotometer.

The physical properties of a 0.60:0.07:033 molar ratio ZrF$_4$:ThF$_4$:BaF$_2$ glass prepared in accordance with the above process are shown in the following table:

TABLE

Physical Properties of 0.60 ZrF$_4$:0.07 ThF$_4$:0.33 BaF$_2$ Glass (Prepared in CCl$_4$ Atmosphere)

| Properties | Values |
|---|---|
| Optical transparency | 0.3 $\mu$m UV to 7 $\mu$m IR$^a$ |
| Density | 4.8 g/cm$^3$ |
| Glass transition temp.$^d$ | 295° C. |
| Crystallization temp.$^d$ | 390° C. |
| Fusion temp.$^d$ | 485° C. |
| Refractive index (n$_D$) | 1.53 |
| Knoop hardness$^b$ (Kg-mm$^{-2}$) | 250 |
| Humidity effects | Water insoluble |
| Heat capacity (C$_p$) at 45° C.$^d$ | 0.511 J/g-°C. |
| Coefficient of linear expansion$^d$ | |
| 30 to 60° C. | 4.3 × 10$^{-6}$/°C. |
| 250 to 270° C. | 13.8 × 10$^{-6}$/°C. |
| Rupture strength$^c$ | 35,300 psi |
| Absorption coefficient at HF laser wavelength$^a$ (2.8 $\mu$m) | 6 × 10$^{-3}$ cm$^{-1}$ |
| Absorption coefficient at DF laser wavelength (3.8 $\mu$m) | 2 × 10$^{-3}$ cm$^{-1}$ |

$^a$Prior art fluoride glass shows a strong absorption at 2.85 $\mu$m.
$^b$Single crystal calcium fluoride (CaF$_2$) is 155.
$^c$Forged CaF$_2$ is 14,000 psi.
$^d$Measured with DuPont thermal analyzer model 1090.

It should be noted that ultra pure reactants are a must for this process. In this connection, we preconditioned our starting materials as follows: zirconium tetrafluoride (ZrF$_4$), of 99.5% purity obtained from the Cerac Company of Milwaukee, Wis., was treated with dry HF at 400° C. and sublimed once at 900° C. in a stainless steel sublimator; thorium tetrafluoride was derived from 99.9% thorium oxide ($THO_2$). The oxide was first reacted with a 49% aqueous HF solution, and then the water was evaporated away at approximately 100° C. until a dry powder resulted. This powder was slowly heated and subjected to gaseous HF until melting occurred and subsequently allowed to cool; and barium fluoride ($BaF_2$), obtained from EM Laboratories of Elmsford, N.Y. at 99.9% purity was treated with dry HF at 1000° C. prior to its use as a starting material.

INDUSTRIAL APPLICABILITY

Fluorozirconate glasses prepared in accordance with this invention are useful as laser windows and as fiber optic elements. These applications are the result of the excellent optical transparency exhibited from 0.20 $\mu m$ in the UV to 8 $\mu m$ in the IR and the excellent mechanical strength of the glass. For example, laser calorimetry at the HF wavelength 2.8 $\mu m$ and the DF wavelength 3.8 $\mu m$ shows absorption coefficients of only $6 \times 10^{-3} cm^{-1}$ and $2 \times 10^{-3} cm^{-1}$ respectively; and several meters of fiber have been extruded at the very manageable temperature of 385° C. which readily transmits He-Ne laser light.

Glass molding experiments indicate glass, prepared in accordance with this invention, can be easily molded to give good replication of the die surface. This implies an inexpensive technique for casting optic elements of diverse geometries such as IR domes, laser windows and lenses.

Other uses for glasses of this invention are as Faraday rotators, powdered source of atomic fluorine for excimer laser, submillimeter wave domes, lenses and submillimeter wave guides.

Having completely disclosed our invention and having provided teachings to enable others to make and use the same, the scope of our claims may now be understood as follows.

What is claimed is:

1. An improved process for making infrared-transparent glasses from the fluorides of zirconium, thorium and barium wherein said improvement is comprised of the steps of:
   (a) forming a melt from preselected molar proportions of ultra pure $ZrF_4$, $BaF_2$ and $ThF_4$, in the presence of a reactive atmosphere comprised of HF and He, and soaking said melt in said atmosphere thereby reducing the $OH^-$ and/or $O^=$ concentration of said melt to an insignificant level;
   (b) subsequently replacing said reactive atmosphere with a rectification mixture of He and $CCl_4$ as a nascent chlorine source thereby eliminating the color-center formation which occurs during the exposure of said melt to said HF/He mixture; and
   (c) subsequently casting, annealing and cooling said melt to a glass in the presence of said rectification mixture.

Figure 2:
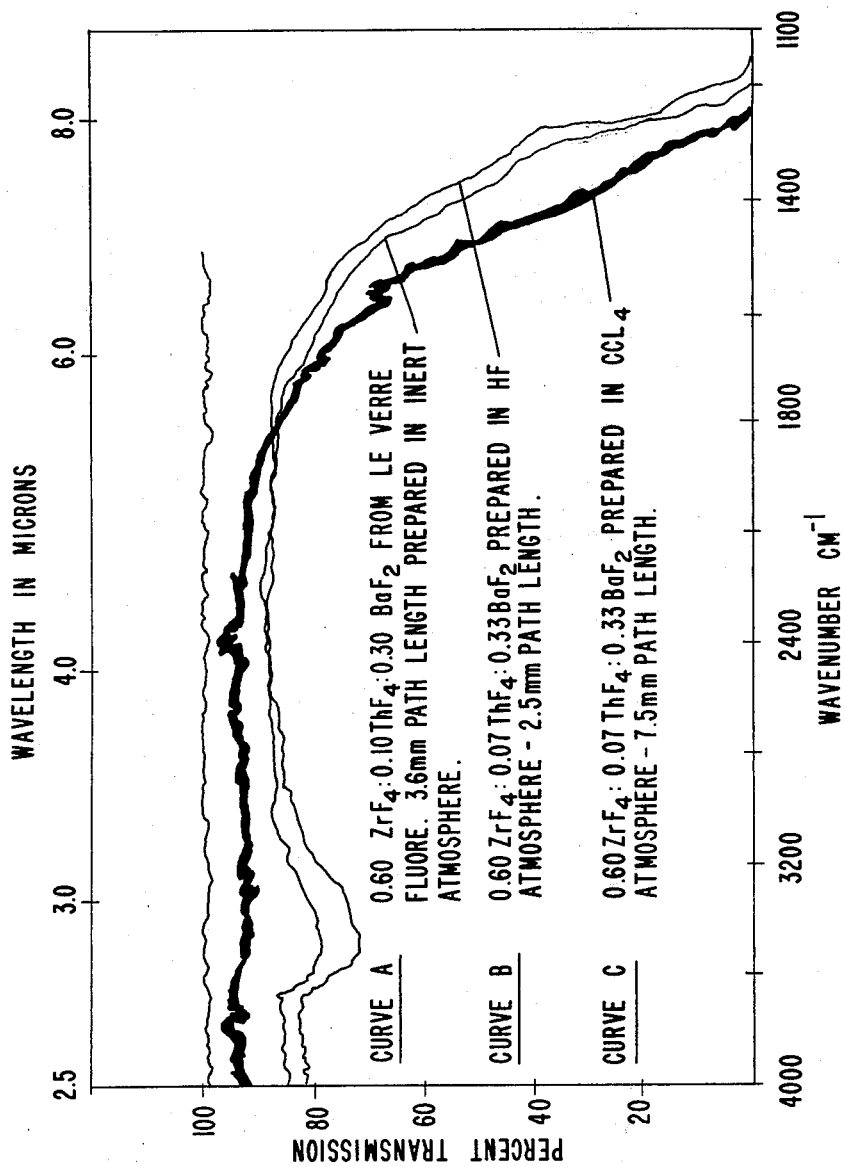
FIG. 2 is a transmission spectra of fluorozirconate glasses.

2. A new and improved fluorozirconate glass that is continuously transparent to light from the near ultra violet through the near infrared spectrum substantially as shown in FIG. 2 comprising preselected molar proportions of $ZrF_4$, $ThF_4$ and $BaF_2$, that are essentially free of hydroxide and oxide impurities which produce adsorption bands at 2.9 micrometer wavelengths, cast from a melt in the presence of a mixture of He and $CCl_4$ to thereby compensate for fluorine deficiencies, which cause a formation of the color-center of said glass, by the introduction of a chlorine dopant.

3. A fluorozirconate glass of claim 2 wherein 0.58 moles of $ZrF_4$, 0.33 moles of $BaF_2$ and 0.09 moles of $ThF_4$ have been combined in the molten state in the presence of a reactive atmosphere of HF and He and cast, annealed and cooled to a vitreous state in the presence of a rectification mixture of $CCl_4$ and He.

4. A fluorozirconate glass continuously transparent to light from the near-ultraviolet through the near-infrared wavelength spectrum substantially as shown in FIG. 2 prepared by the process of:
   (a) preconditioning selected reactants taken from the group consisting of $ZrF_4$, $BaF_2$ and $ThF_4$, to remove hydroxyl and oxide ion contaminants;
   (b) forming a mixture of said reactants in selected molar proportions which define compositions that fall within the vitreous domain for $ZrF_4$-$ThF_4$-$BaF_2$;
   (c) raising the temperature of said reactant mixture to form a melt in the presence of a reactive gaseous atmosphere comprised of HF and He and soaking said melt in said atmosphere for an extended time period;
   (d) subsequently replacing said reactive atmosphere with a rectification mixture of $CCl_4$ as a nascent chlorine source and He, thereby eliminating color-center formation which occurs during said soak in said reactive atmosphere, by the introduction of a chlorine dopant; and
   (e) sequentially casting, annealing and rapidly cooling said melt to a vitreous state in the presence of said rectification mixture.

5. An improved process for forming an infrared-transparent glass from the fluorides of zirconium, thorium and barium wherein said improvement is comprised of the steps of:
   (a) preconditioning said fluorides by exposing each of them to reactive atmospheres containing HF at elevated temperatures thereby removing undesirable $OH^-$ and $O^=$ contaminants;
   (b) forming a melt from a mixture of said preconditioned fluorides, in preselected molar proportions, in the presence of a reactive atmosphere containing He and $CCl_4$ as a nascent chlorine source by raising the temperature of said fluorides to at least 800° C. and maintaining a constant temperature RA purge for at least six hours whereby a chlorine dopant is added; and
   (c) casting, annealing and cooling said melt to a vitreous state in the presence of said chlorine source species and He atmosphere.

6. A fluorozirconate glass continuously transparent to light from the near-ultraviolet through the near-infrared wavelength spectrum substantially as shown in FIG. 2 prepared by the process of claim 5.

7. A fluorozirconate glass comprised of $ZrF_4$, $ThF_4$ and $BaF_2$ that is prepared by the process of claim 5 and thereby doped with Cl.

8. A new and improved fluorozirconate glass that is continuously transparent to light from the near-ultraviolet through the near-infrared wavelength spectrum substantially as shown in FIG. 2 comprising preselected molar proportions of oxide and hydroxide free $ZrF_4$, $ThF_4$ and $BaF_2$ doped with trace quantities of chloride ions.

9. A glass in accordance with claim 8, wherein 0.58 moles of $ZrF_4$, 0.33 moles of $BaF_2$ and 0.09 moles of $ThF_4$ are doped with trace quantities of chloride ions.

* * * * *